United States Patent [19]

Hayashi et al.

[11] Patent Number: 4,704,041

[45] Date of Patent: Nov. 3, 1987

[54] PRINT HEAD HAVING ROLLED SPRING ARMS WITH UNIFORM RESPONSE

[75] Inventors: Mikio Hayashi; Haruo Inoue, both of Tokyo, Japan

[73] Assignee: Seikosha Co., Ltd., Tokyo, Japan

[21] Appl. No.: 879,058

[22] Filed: Jun. 26, 1986

[30] Foreign Application Priority Data

Jul. 11, 1985 [JP] Japan ................................. 60-153230

[51] Int. Cl.$^4$ ............................. B41J 3/12; F16F 1/34
[52] U.S. Cl. ................................ 400/124; 101/93.05; 267/161
[58] Field of Search ............................... 400/121, 124; 101/93.04, 93.05; 335/274; 29/602 R; 267/158, 161, 181

[56] References Cited

U.S. PATENT DOCUMENTS 4,225,250 9/1980 Wagner ............................... 400/124
4,493,567 1/1985 Tada ..................................... 400/124

FOREIGN PATENT DOCUMENTS 155473 8/1985 Japan ................................... 400/124

OTHER PUBLICATIONS

*IBM Tech. Disc. Bulletin*, R. L. Herman, vol. 27, No. 4B, Sep. 1984, pp. 2564–2565.

Primary Examiner—Paul T. Sewell
Attorney, Agent, or Firm—Bruce L. Adams; Van C. Wilks

[57] ABSTRACT

A print head for use in an impact printer has resilient driving arms for actuating print hammer or print elements at a high speed. The arms extend radially inwardly, and are connected together at their outer ends and formed of a single rolled metal. The arms differ in at least one of length, width, thickness or shape, according to the angles that the longitudinal directions of the hammers make with the direction in which the metal has been rolled, so that the hammer can have the same natural frequency or produce the same resilient force.

2 Claims, 3 Drawing Figures

PRINT HEAD HAVING ROLLED SPRING ARMS WITH UNIFORM RESPONSE

FIELD OF THE INVENTION

The present invention relates to a print head for use in an impact printer such as a wire printer.

BACKGROUND OF THE INVENTION

A print head for use in an impact printer such as a wire printer is disclosed in, for example, Japanese Patent Laid-Open No. 11615/1978, where the number of driving arms is equal to the number of print elements such as wires. The arms have the same length respectively and are arranged radially. The arms are actuated by electromagnetic driver devices having coil cores that are aranged on a circle. Therefore, the number of component parts of the print head increase.

In an attempt to reduce the number of component parts, an improved pint head has been proposed in Japanese Patent Laid-Open No. 154178/1980, where driving arms are fabricated as one unit. In particular, the arms are frmed of a single rolled metal by a press working so that the arms are connected together at their outer ends like a ring. However, all of the arms have the same shape and the same dimensions, and are actuated by electromagnetic driver devices having coil cores arranged on a same circle similarly to the aforementioned known print head.

It should be noted that the rolled metal has a different Young's modulus by changing a dirction to the direction of rolling. For this reason, the arms of the latter-mentioned print head differ in Young's modulus respectively and so they vary in natural frequency and produce different resilient forces. Therefore, the arms respond at different rates. As a result, the head may form incorrect dots or may print at various pressure. Variations in response do not pose serious problems in printers of the type where the print speed is about 100 characters per second or less. However, the variations in response affect materially the print quality in high-speed printers whose print speed is about 200 characters per second or in ultra high-speed printers whose print speed is about 400 characters per second.

SUMMARY OF THE INVENTION

It is an object of the present invention to eliminate the variations in response of driving arms which are formed of a single rolled metal so as to connect together at their outer ends.

It is another object of the invention to eliminate the variation in printing pressure of driving arms which are formed of a single rolled metal so as to connect together at their outer ends.

The above objects are achieved in accordance with the teachings of the present invention by a print head having driving arms which differ in at least one of length, width, thickness or shape, according to the angle of the arms relative to the direction of rolling of the rolled metal, so that the arms can have the same natural frequency or produce the same resilient force one another.

Other objects and features of the invention will appear in the course of the description thereof which follows.

DETAILED DESCRIPTION OF THE INVENTION

Figure 1:
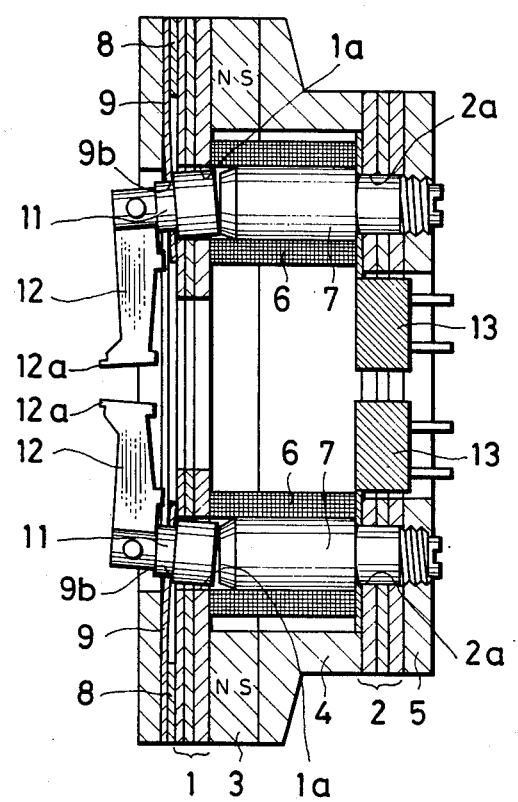
FIG. 1 is a side elevation view in cross section of a print head according to the present invention.

Referring to FIG. 1, there is shown a print head according to the present invention. This head has a front yoke plate 1 consisting of three layers and a rear yoke plate 2 also consisting of three layers. A doughnut-like permanent magnet 3 and a yoke frame 4 are mounted between the yoke plates 1 and 2. A nonmagnetic auxiliary plate 5 is coupled to the rear surface of the rear yoke plate 2. Coils 6 are wound on cores 7 to actuate resilient driving arms $9_{a1}$ to $9_{a8}$ (see FIG. 2). The rear end of each core 7 extends through a hole 2a formed in the rear yoke plate 2, and is screwed to the auxiliary plate 5. Thus, the core 7 can be moved back and forth, for adjustment of its position. The eight driving arms $9_{a1}$ to $9_{a8}$ are mounted on the front each other by a spacer ring 8. A stopper plates 10 is mounted in front of the dviving arms $9_{a1}$ to $9_{a8}$, which are provided with holes 9b at their front ends. Movable yokes (armatures) 11 extend through, and are fixedly attached to, the holes 9b. A print hammer 12 acting as print element is rigidly attached to the front end of each movable yoke 11. The hammer 12 has an impacting protrusion (print element) 12a at its distal end. The rear portion of each movable yoke 11 extends through a hole 1a formed in the front yoke plate 1. The rear end surface of the yoke 11 faces the front end surface of the corresponding core 7. The movable yoke 11 is magnetically attracted to the core 7 against the resilient force of the corresponding driving arm 9. Indicated by numeral 13 are terminal plates for the coils 6.

Figure 2:
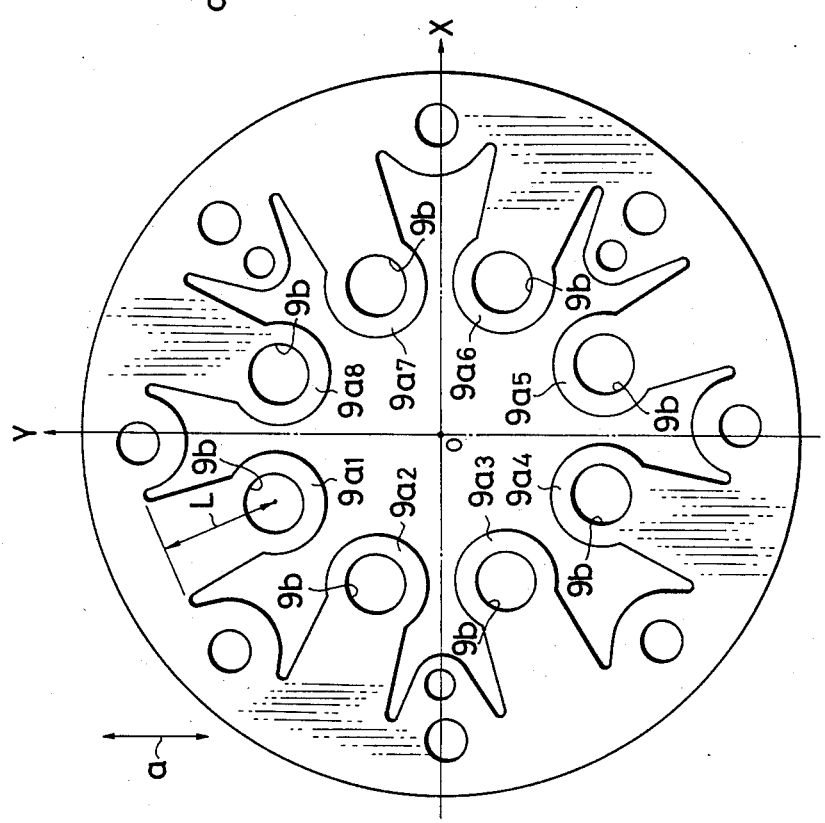
FIG. 2 is a front elevation view of the driving arms shown in FIG. 1.

Referring to FIG. 2, the driving arms $9_{a1}$ to $9_{a8}$ have been formed of a single rolled metal by a press working. In this embodiment, the eight arms are connected together at their outer ends, and extend radially inward. The material of the arms is rolled in the direction indicated by the arrow a. As mentioned previously, it is the common practice to design such drinving arms to have the same shape and the same dimensions. The present invention has been devised by taking into account the fact that driving arms inclined at different angles to the rolling direction a exhibit different young's modulus. Specifically, the arms $9_{a1}$ to $9_{a8}$ are designed to have different lengths, depending on the angles that the longitudinal directions of the arms make with the rolling direction a, so that the arms can have the same natural frequency or produce the same resilient force. As an example, the lengths of the arms $9_{a2}$, $9_{a3}$, $9_{a4}$ are set equal to 1.032L, 1.030L, 0.997L, respectively, whre L is the length of the arm $9_{a1}$. Since the arms $9_{a1}$ to $9_{a8}$ are arranged symmetrically with respect to the center O in this example, the arms $9_{a5}$, $9_{a6}$, $9_{a7}$, $9_{a8}$ are identical in length to the arms $9_{a1}$, $9_{a2}$, $9_{a3}$, $9_{a4}$, respectively. Therefore, the holes 9b in the arms $9_{a1}$ to $9_{a8}$, the movable yokes 11, and the cores 7 are not located on the same circle.

Figure 3:
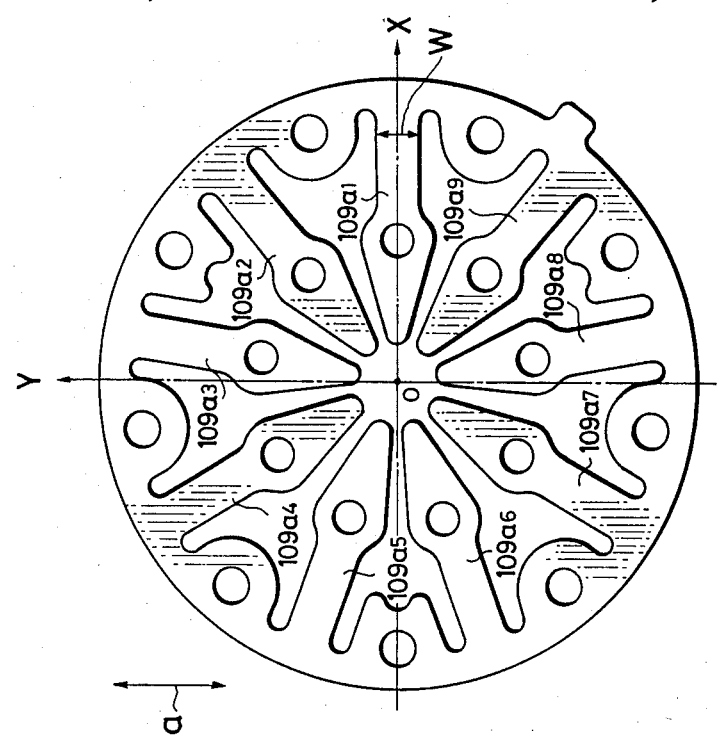
FIG. 3 is a front elevation view of driving arms of another embodiment.

Referring next to FIG. 3, there are shown other resilient driving arms for use in a print head. The nine arms $109_{a1}$ to $109_{a9}$ are formed in a symmetrical relation with respect to the X-axis. The arms have the same length, but differ in width according to the angles that the longitudinal directions of the arms make with the rolling direction a. Thus, all of the arms have the same natural frequency or produce the same resilient force. For instance, the widths of the arms $109a_2$, $109a_3$, $109a_4$, $109a_5$, are 1.039w, 1.122w, 1.083w, 1.015w, respectively, where w is the width of the arms $109a_1$. The arms $109a_6$ to $109a_9$ have widths the same as the arms $109a_2$ to $109a_5$, respectively, which are on the opposite side of the X-axis. The movable yokes (not shown) rigidly fixed to the arms $109a_1$ to $109a_9$ are located on the same circle. Also, the cores (not shown) are situated on the same circle.

In the above embodiments, the driving arms have different lengths or widths so that they can have the same natural frequency or produce the same resilient force. It is also possible to make the driving arms different in thickness, by making use of milling or grinding works. Although the arms $9a_1$ to $9a_8$ shown in FIG. 2 take a substantially trapezoidal form and taper off, the form may be varied by changing the degree to which they taper off. Of course, the arms may be made different in two or more of length, width, thickness, and shape in such a way that all of the arms have the same natural frequency or produce the same resilient force.

According to the present invention, the resilient driving arms have the same natural frequency, in spite of the fact that they are formed of a single rolled metal as one unit. Hence, the arms do not vary in response characteristics. Therefore, when moved at a high speed, they do not malfunction. Further, they are set into operation without delay. Consequently, improved reliability and print quality can be provided. Also, the arms can produce the same resilient force, although they are formed of a rolled metal as one unit. Thus, the arms exert the same driving force on the print elements, and bend to the same extent. As a result, the dots to be formed do not differ in print darkness. In this way, print quality can be improved.

What is claimed is:

1. In a print head having resilient driving arms for driving print elements which are formed of a single rolled metal as one unit so as to be connected together at outer ends thereof, the improvement wherein the arms differ in at least one of length, width, thickness or shape, according to the angles that the longitudinal directions of the arms make with the direction in which the metal has been rolled, whereby the arms have the same natural frequency.

2. In a print head having resilient driving arms for driving print elements which are formed of a single rolled metal as one unit so as to be connected together at outer ends thereof, the improvement wherein the arms differ in at least one of length, width, thickness or shape, according to the angles that the longitudinal directions of the arms make with the direction in which the metal has ben rolled, whereby the arms produce the same resilient force.

* * * * *